United States Patent
Okazaki et al.

(10) Patent No.: US 9,353,448 B2
(45) Date of Patent: May 31, 2016

(54) ELECTROLYTIC ELECTRODE, ANODE FOR ELECTROLYTIC PRODUCTION OF OZONE, ANODE FOR ELECTROLYTIC PRODUCTION OF PERSULFURIC ACID AND ANODE FOR ELECTROLYTIC OXIDATION OF CHROMIUM

(75) Inventors: Tsuyoshi Okazaki, Hiratsuka (JP); Nobuyasu Ezawa, Ageo (JP)

(73) Assignee: Tanaka Kikinzoku Kogyo K.K., Chiyoda-ku, Tokyo (JP)

( * ) Notice: Subject to any disclaimer, the term of this patent is extended or adjusted under 35 U.S.C. 154(b) by 421 days.

(21) Appl. No.: 13/823,877

(22) PCT Filed: Sep. 14, 2011

(86) PCT No.: PCT/JP2011/070972
§ 371 (c)(1),
(2), (4) Date: Mar. 15, 2013

(87) PCT Pub. No.: WO2012/036196
PCT Pub. Date: Mar. 22, 2012

(65) Prior Publication Data
US 2013/0175165 A1    Jul. 11, 2013

(30) Foreign Application Priority Data
Sep. 17, 2010   (JP) .................................. 2010-209763

(51) Int. Cl.
*C25B 11/00*   (2006.01)
*C25B 11/04*   (2006.01)
(Continued)

(52) U.S. Cl.
CPC ........... *C25B 11/0431* (2013.01); *C02F 1/4672* (2013.01); *C23C 10/22* (2013.01);
(Continued)

(58) Field of Classification Search
CPC ............ C25B 1/13; C25B 1/22; C25B 1/285; C25B 11/00–11/18; C23C 18/08; C23C 16/56; C23C 14/5806; C23C 10/00–10/60; C25D 5/50; C25D 17/10–17/14; C02F 1/46109; C02F 2001/46119–2001/46171

USPC .................. 204/290.12, 290.13, 290.14, 292; 427/226, 124, 123, 125; 205/554, 572, 205/526
See application file for complete search history.

(56) References Cited

U.S. PATENT DOCUMENTS 3,096,272 A * 7/1963 Beer .............................. 204/284
3,497,425 A * 2/1970 Cotton et al. .................. 205/170
(Continued)

FOREIGN PATENT DOCUMENTS

| CN | 1550576 | 12/2004 |
| CN | 101235513 | 8/2008 |

(Continued)

OTHER PUBLICATIONS

Donachie (Titanium: A Technical Guide, 2000, pp. 13-17, https://books.google.com/books?id=HgzukknbNGAC&lpg=PA13&ots=K-2Wgc6H_P&dq=titanium%20crystal%20grain%20orientation&pg=PA13#v=onepage&q&f=false).*

(Continued)

*Primary Examiner* — Luan Van
*Assistant Examiner* — Alexander W Keeling
(74) *Attorney, Agent, or Firm* — Orrick Herrington & Sutcliffe, LLP

(57) ABSTRACT

An electrolytic electrode includes an electrode surface layer formed by a high-temperature heat treatment under a low oxygen partial pressure of 100 Pa or less and includes a valve metal oxide film, the electrode surface layer having, just beneath, a layer which includes a valve metal and a noble metal excluding silver and the noble metal is precipitated and dispersed in a crystal grain boundary of the valve metal, wherein a crystal of the valve metal in a range of down to 30 μm in a vertical depth direction from the electrode surface is a crystal grain being elongated in a vertical cross-section from the electrode surface and a content of the noble metal in a range of down to 10 μm in the vertical depth direction from the electrode surface is 5 at % or less.

9 Claims, 10 Drawing Sheets

(51) Int. Cl.

| | |
|---|---|
| *C23C 10/22* | (2006.01) |
| *C25B 1/13* | (2006.01) |
| *C02F 1/467* | (2006.01) |
| *C25D 11/38* | (2006.01) |
| *C25D 17/10* | (2006.01) |
| *C25D 11/00* | (2006.01) |
| *C25B 1/28* | (2006.01) |
| *C02F 1/78* | (2006.01) |
| *C02F 1/461* | (2006.01) |

(52) U.S. Cl.
CPC .................. *C25B 1/13* (2013.01); *C25B 1/285* (2013.01); *C25B 11/0442* (2013.01); *C25B 11/0484* (2013.01); *C25B 11/0494* (2013.01); *C25D 11/005* (2013.01); *C25D 11/38* (2013.01); *C25D 17/10* (2013.01); *C01B 2201/24* (2013.01); *C02F 1/78* (2013.01); *C02F 2001/46133* (2013.01); *C02F 2001/46138* (2013.01)

(56) References Cited

U.S. PATENT DOCUMENTS

| | | | |
|---|---|---|---|
| 4,797,182 | A | 1/1989 | Beer et al. |
| 7,156,962 | B2 | 1/2007 | Koizumi et al. |
| 7,201,830 | B2 | 4/2007 | Mojana et al. |
| 7,378,005 | B2 | 5/2008 | Kaneda et al. |
| 2003/0024828 | A1 | 2/2003 | Kondo et al. |
| 2004/0011665 | A1 | 1/2004 | Koizumi et al. |
| 2004/0226817 | A1 | 11/2004 | Hosonuma |
| 2005/0109614 | A1 | 5/2005 | Mojana et al. |
| 2006/0042937 | A1 | 3/2006 | Kaneda et al. |
| 2006/0272939 | A1 | 12/2006 | Kaneda et al. |
| 2007/0034505 | A1 | 2/2007 | Ikematsu et al. |
| 2008/0060947 | A1* | 3/2008 | Kitsuka et al. ................ 205/466 |
| 2008/0233427 | A1* | 9/2008 | Affeldt et al. ................ 428/652 |

FOREIGN PATENT DOCUMENTS

| | | |
|---|---|---|
| EP | 0243302 | 10/1987 |
| EP | 0344378 | 6/1992 |
| JP | H2-282491 | 11/1990 |
| JP | 06-293998 | 10/1994 |
| JP | H8-085894 | 2/1996 |
| JP | 2001262385 | 9/2001 |
| JP | 2005539135 | 12/2005 |
| JP | 200697122 | 1/2006 |
| JP | 2006131987 | 5/2006 |
| JP | 200716303 | 1/2007 |
| JP | 2007046129 | 2/2007 |
| JP | 2007224351 | 6/2007 |
| JP | 2010156034 | 7/2010 |
| TW | 539775 | 7/2003 |
| WO | 03000957 A1 | 3/2003 |

OTHER PUBLICATIONS

Chinese Office Action, dated Oct. 31, 2014, issuing in counterpart CN Appln. No. 201180044792.7, and English translation.
ISA 210.
ISA 237.

* cited by examiner a)

b)

a)

20 μm b)

20 μm

US 9,353,448 B2

ELECTROLYTIC ELECTRODE, ANODE FOR ELECTROLYTIC PRODUCTION OF OZONE, ANODE FOR ELECTROLYTIC PRODUCTION OF PERSULFURIC ACID AND ANODE FOR ELECTROLYTIC OXIDATION OF CHROMIUM

TECHNICAL FIELD

The present invention relates to an electrolytic anode. More specifically, the present invention relates to an electrolytic anode employed, for example, for sterilization at a food processing or medical site, water treatment/sterilization of water/sewage or wastewater, cleaning in a semiconductor device manufacturing process, production of a peroxide such as ammonium persulfate, or control of a chromium ion concentration in hexavalent chromium (Cr(VI)) plating.

BACKGROUND ART

In general, bacteria such as *Legionella* attach to circulating water or the like of an air conditioning unit and along with operation of such equipment, the bacteria are discharged outdoors through an outlet, as a result, the bacteria float in the air. In addition, bacteria such as *Legionella* proliferate also in the remaining bath water of a home bathtub. Active oxygen, particularly, ozone is a very strongly oxidative substance, and ozonated water containing dissolved ozone is being utilized in a field requiring ozone, for example, for cleaning/sterilization treatment such as sterilization at a food processing or medical site, for water treatment/sterilization of water/sewage or wastewater (e.g., general wastewater, ballast water) containing organic materials such as malonic acid and odorous geosmin, bacteria or the like, or for cleaning in a semiconductor device manufacturing process. As the method for producing ozonated water, a method of producing ozone in water by electrolysis of water is known. Furthermore, a peroxide such as ammonium persulfate is known as a cleaning agent such as resist remover used similarly in the process of producing a semiconductor circuit, and there is used an electrolytic oxidation reaction of sulfuric acid by active oxygen such as ozone produced upon an electrolytic reaction of aqueous sulfuric acid in the production of the peroxide, or an electrolytic reaction directly from sulfuric acid.

As the anode for ozone production, which is used in the electrolysis of water, an electrode obtained by coating lead oxide on a substrate such as valve metal, or a pure platinum (Pt) electrode is used. However, the former has a problem of reducing the electrode life due to delamination during electrolysis or an environmental problem such as elution of a harmful substance adversely affecting the human body, and the latter electrode not only fails in obtaining an adequate electrode activity (oxygen overvoltage) but also is expensive to cause an economical problem. As described in Patent Literatures 1 to 3 recited later, an electrode composed of titanium (Ti) and platinum (Pt) is also known in general, and the Pt-coated Ti may be free from an environmental problem of the lead oxide ($PbO_2$) or an economical problem of the pure platinum material but cannot obtain an adequate electrode activity (oxygen overvoltage).

In addition, there is a problem that a long electrode life cannot be sufficiently obtained. Also, for example, an electrode produced by heat-treating a Pt-coated Ti alloy at 400 to 700° C. and an electrode produced by forming a layer from a mixture of Pt powder and Ti metal or Ti oxide powder have been developed. However, these electrodes have a problem such as low ozone production efficiency and heavy wear.

The material used as the anode for ozone production is a valve metal such as Ti, zirconium (Zr), niobium (Nb) and tantalum (Ta), which is generally employed as the electrode substrate material. Many valve metals are known to have a high oxygen overvoltage and therefore, have an ozone formation potential when used as an anode. However, the surface of an electrode formed of a valve metal is oxidized by electrolysis and the oxide layer becomes thick and serves as an insulator, as a result, the function as an electrode is impaired and the electrode is short-lived. For this reason, it is considered to utilize a thin Ta oxide layer as a dielectric material on the electrode surface (WO 2003/000957). However, even when this electrode is used, there is a problem that although a good ozone production efficiency may be obtained at the initial stage of use, the initial characteristics are not kept long and the electrode life is insufficient.

In order to solve those problems, an electrode where a noble metal layer such as Pt is formed as an intermediate layer on an electrode substrate and sequentially, a valve metal oxide layer (dielectric layer) such as Ti is formed in the surface region has been reported (Patent Literatures 1 to 3). These electrodes have a problem that formation or firing of a thin layer must be repeated a plurality of times so as to form an intermediate layer or a surface layer and the number of working steps is large. Also, there is a problem that the adherence between the noble metal layer and the valve metal oxide layer is not sufficient and furthermore, the electrode surface property at the electrolytic reaction interface is changed during use, failing in maintaining a high electrolytic oxidizing ability for a long time.

As the electrolytic anode used for the production of a persulfuric acid such as ammonium persulfate, for example, a platinum ribbon is used. However, a sufficient oxygen overvoltage is not obtained by an electrolysis treatment using the platinum ribbon and the wear amount of electrode becomes large under harsh electrolysis conditions, giving rise to a problem that a wasted electrode component is mingled as an impurity in the electrolytic solution or a problem that the electrode must be changed frequently.

For solving such a problem, there has been devised a production method of a persulfuric acid-dissolved water, including electrolyzing a sulfate ion-containing aqueous solution by using an electrode to produce a persulfuric acid-dissolved water, where the electrode uses a substrate such as valve metal and contains a less oxidizing metal such as platinum group metal in an intermediate layer and a valve metal oxide-containing surface layer is formed on the electrode surface (JP-A-2007-016303). However, even by this method, a high oxygen overvoltage cannot be continually obtained and not only the electrode life is short but also the persulfuric acid production efficiency is insufficient.

Conventionally, for the anodic electrode used in Cr(VI) plating, lead or a lead alloy has been used because of its high electrolytic oxidizing ability. Such an anode can oxidize Cr(III) to Cr(VI) to properly control the Cr ion concentration but has a problem that, for example, lead chromate is precipitated in a large amount due to anode dissolution during use or a lead compound or lead ion is mingled in the waste liquid.

For solving such a problem, a method of performing plating by using, for the anode, an insoluble electrode using a platinum group metal and an oxide thereof as the main component is known. However, such an anodic electrode is very low in the ability of oxidizing Cr(III) to Cr(VI) as compared with the anodic electrode made of lead or a lead alloy and therefore, has a problem that the Cr ion concentration in the plating bath can be hardly controlled.

As a measure to solve this problem, there has been devised a method where an insoluble electrode obtained by coating a platinum group metal on a Ti-containing metal substrate is used and an additive such as silver nitrate or silver oxide is added to the plating solution to thereby control the Cr ion concentration in the Cr(VI) plating (JP-A-2006-131987). However, even when this method is used, the Cr ion concentration cannot be sufficiently controlled, and a problem such as control of the additive amount or contamination of the chromium plating film by the additive exists.

CITATION LIST

Patent Literature

Patent Literature 1: JP-A-2007-224351
Patent Literature 2: JP-A-2007-46129
Patent Literature 3: JP-A-2006-97122

SUMMARY OF INVENTION

Technical Problem

The anode for ozone production used for electrolysis of water has a problem that a high oxygen overvoltage of initial characteristics is not kept long and the electrode life is insufficient. The electrode used for producing persulfuric acid by electrolysis of a sulfuric acid ion-containing aqueous solution is also not satisfied with both the oxygen overvoltage and the electrode life. The anodic electrode for performing electrolysis, for example, in a sulfuric acid solution used for Cr(VI) plating cannot sufficiently control the Cr ion concentration and has a problem such as control of the additive amount or contamination of the chromium plating film by the additive.

Solution to Problem

Considering these problems, an object of the present invention is to provide a long-life electrolytic electrode having a novel electrode surface-near structure formed by a noble metal and a valve metal and having a high oxygen overvoltage and a high electrolytic oxidizing ability based on a new interface reaction.

A first aspect relates to an electrolytic electrode, including: an electrode surface layer formed by a high-temperature heat treatment under a low oxygen partial pressure of 100 Pa or less, wherein the electrode surface layer includes a valve metal oxide film, the electrode surface layer having, just beneath, a layer which includes a valve metal and a noble metal excluding silver (Ag), wherein the noble metal is precipitated and dispersed in a crystal grain boundary of the valve metal, wherein a crystal of the valve metal in a range of down to 30 μm in a vertical depth direction from the electrode surface is a crystal grain being elongated in a vertical cross-section from the electrode surface, and a content of the noble metal in a range of down to 10 μm in the vertical depth direction from the electrode surface is 5 at % or less.

A second aspect is an aspect related to the electrolytic electrode according to the first aspect, wherein the noble metal is a platinum group metal.

A third aspect is an aspect related to the electrolytic electrode according to the first aspect, wherein the noble metal is platinum (Pt), iridium (Ir), ruthenium (Ru) or palladium (Pd).

A fourth aspect is an aspect related to the electrolytic electrode according to the first aspect, wherein the content of the noble metal in the range of down to 10 μm in the vertical depth direction from the electrode surface is from 0.01 to 5 at %.

A fifth aspect is an aspect related to the electrolytic electrode according to the first aspect, wherein the valve metal is titanium (Ti) or zirconium (Zr).

A sixth aspect is an aspect related to the electrolytic electrode according to the first aspect, wherein a thickness of the valve metal oxide film on a surface in an electrode surface-near region is from 3 to 200 nm.

A seventh aspect is an aspect related to the electrolytic electrode according to the first aspect, which is used as an anode for producing ozone by electrolysis of an aqueous solution.

An eighth aspect is an aspect related to the electrolytic electrode according to the first aspect, which is used as an anode for producing a persulfuric acid by electrolysis of a sulfate ion-containing aqueous solution.

A ninth aspect is an aspect related to the electrolytic electrode according to the first aspect, which is used as an anode for oxidizing trivalent chromium (Cr(III)) to hexavalent chromium (Cr(VI)) in a chromium (Cr) plating bath.

Advantageous Effects of Invention

As described above, the electrolytic electrode according to the present invention is an electrode having a novel electrode surface-near structure formed by a noble metal and a valve metal, having a high oxygen overvoltage and a high electrolytic oxidizing ability based on a new interface reaction, and enabling an electrolytic reaction to be stably performed with high efficiency over a long period of time while causing no deterioration of the electrode. The electrolytic electrode according to the present invention ensures that at the production of ozone or persulfuric acid, at the oxidation reaction for controlling the Cr ion concentration in Cr(VI) plating, or at the production of a peroxide by anodic electrolysis, the interface reaction is accelerated and the electrode has a high oxygen overvoltage and high corrosion resistance as compared with conventional electrodes and can be used for a long time. Incidentally, this electrolytic electrode can be used also as a cathode and can switch the polarity.

MODES FOR CARRYING OUT INVENTION

Figure 1:
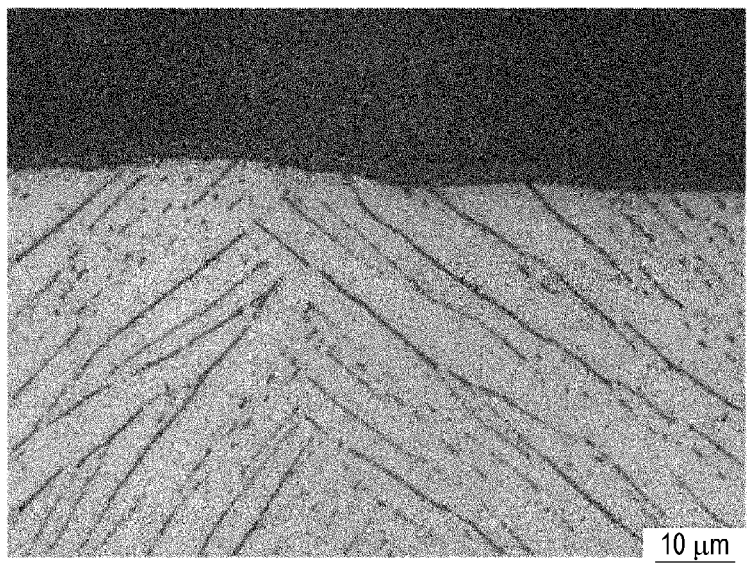
FIG. 1 shows the structure in the electrode surface-near region, and shows (a) an optical micrograph of a cross-section of an electrode according to the present invention, and (b) a platinum mapping analysis result by an electron probe microanalyzer.
Figure 1:
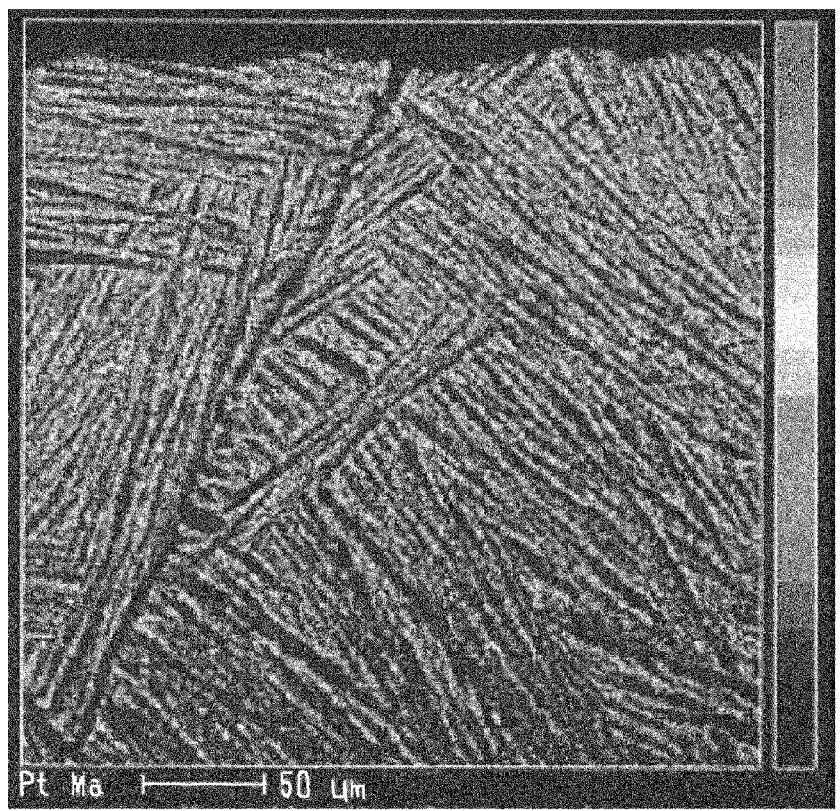

The electrolytic electrode according to the present invention and the production method thereof are described below in order. First, preferred embodiments of the electrolytic electrode according to the present invention are described below, but the present invention is not limited to those embodiments.

The electrode according to the present invention is an electrolytic electrode having an electrode surface containing a valve metal oxide, in which the substrate of the electrode surface layer includes an alloy of a valve metal and a noble metal (excluding silver (Ag), hereinafter the same). The electrode surface plays the role of accepting an electron resulting from an electrolytic reaction with a reactant in an aqueous solution (the surface is an oxide and the near region is a metal). The oxide of a valve metal such as Ti and Zr has a high oxygen overvoltage and has a very high electrolytic oxidizing ability such as ozone formation potential when used as an anode. Furthermore, because a passive oxide film is present on the electrode surface, high corrosion resistance is also obtained. However, a thick oxide film has no electrical conductivity and therefore, deprives the electrode itself of electrical conductivity, failing in contributing to an electrolytic reaction. The electrode according to the present invention is characterized in that: the valve metal crystal in the region near the electrode surface (electrode surface-near region) is present as an elongated crystal grain; the content of the noble metal in the range of down to 10 μm in the vertical depth direction from the electrode surface is 5 at % or less; and further, the valve metal on the surface (electrode surface) in the electrode surface-near region has an oxide film. It has been found that when such an electrolytic electrode is used, the corrosion resistance and electrical conductivity are not impaired as compared with conventional electrodes and efficient electrolysis can be performed for a long period of time without involving reduction of the oxygen overvoltage. The crystal of the valve metal in the electrode surface-near region is a crystal grain being elongated in the vertical cross-section from the electrode surface, and the crystal grain boundary is uniformly present in the electrode, where the noble metal contained in the electrode is precipitated in the grain boundary and thereby dispersed. The less oxidizing noble metal precipitated in the crystal grain boundary prevents oxygen from traveling through the grain boundary and intruding into the inside of the electrode even during use of the electrode, so that not only oxidation of the crystal grain can be suppressed but also high electrical conductivity can be obtained, and moreover, due to the noble metal contained in the crystal grain boundary, the surface properties of the crystal grain and the electrode are stably kept, so that an excellent electrolytic function can be continuously exerted. Most of the noble metal is present in the grain boundary, but some is present also in the valve metal crystal lattice. The noble metal in the crystal grain makes it possible to more stably keep the surface properties of the crystal grain and the electrode and exert a more excellent electrolytic function. According to this structure, the electrolytic electrode functions as an electrode excellent in the corrosion resistance without impairing the conductivity. In addition, the valve metal on the electrode surface has an oxide film, making it possible to obtain a high oxygen overvoltage, and the electrode surface region has the above-described structure, so that smooth electron transfer can be achieved and in turn, efficient electrolysis can be performed for a long period of time. In the electrolytic electrode according to the present invention, the content of the noble metal in the range of down to 10 μm in the vertical depth direction from the electrode surface is 5 at % or less. If the content exceeds 5 at %, not only the oxygen overvoltage function is reduced but also the crystal form of the valve metal crystal is partially or entirely changed to incur collapse of the above-described structure excellent in the electrolysis. The content of the noble metal in the range of down to 10 μm in the vertical depth direction from the electrode surface is preferably from 0.01 to 5 at %. If the noble metal content is too small, it becomes difficult to block oxygen from intruding into the crystal grain boundary or into the grain and prevent progress of oxidation of the valve metal, and the electrical conductivity may be impaired. The noble metal is more preferably used to account for 0.1 to 5 at %, most preferably from 0.3 to 3 at %. Incidentally, the elongated crystal grain is a crystal grain shown in the cross-sectional view of the electrode of FIG. 1-*a*. The number of crystal grain boundaries between elongated crystal grains is preferably 3 or more, more preferably from 3 to 30, in the range of down to 30 μm in the vertical depth direction from the electrode surface. The electrode surface-near region of the present invention may be a part or the whole of the electrode but preferably has a size of 10 μm or more in the depth direction from the electrode surface.

The noble metal constituting the electrolytic electrode according to the present invention has excellent corrosion resistance and conductivity and may be composed of a noble metal alone or may be a noble metal alloy (including an oxide). In the case of a noble metal alone, a platinum group metal is preferably used, platinum (Pt), iridium (Ir), ruthenium (Ru) or palladium (Pd) is more preferred, and Pt is most preferred. In the case of using a noble metal alloy, an ally of a noble metal and a non-noble metal may be used, but an alloy of a noble metal and a noble metal is preferred. Above all, a combination of Pt and a platinum group metal (Pt—Ir alloy, Pt—Rh alloy, Pt—Ru alloy, Pt—Pd alloy) is more preferred. In the case of a noble metal oxide, platinum oxide, iridium oxide, palladium oxide or ruthenium oxide is preferably used. Incidentally, silver (Ag) is improper, because this metal not only fails in preventing intrusion of oxygen but also corrodes during electrolysis.

The valve metal used in the electrolytic electrode according to the present invention is a high-melting-point metal capable of forming a passive oxide film, for example, by anodization to impart corrosion resistance, such as Ti, Zr, Nb and Ta, and Ti or Zr is preferably used. Considering the practical utility, Ti is most preferred.

In the electrolytic electrode according to the present invention, the valve metal on the surface in the electrode surface-near region has an oxide film. The oxide film is a film formed by oxidation of a part or the whole of the valve metal exposed to the electrode surface. The thickness of the valve metal oxide film on the electrode surface is preferably from 3 to 200 nm. The thickness is specified to be 3 nm or more, because when an oxide film of about 3 nm is present during an electrolytic reaction, the electrode can sufficiently function as an electrode. If the thickness exceeds 200 nm, electron transfer from the reaction interface to the inside of the electrode is inhibited, and the efficiency of electrolytic reaction may be reduced. Also, the film stress is increased to readily cause separation of the oxide film, and this may disadvantageously cause reduction in the corrosion resistance or durability. The thickness is more preferably from 3 to 100 nm. For example, in the case of a titanium oxide film, it is known that a glossy color with high saturation is observed with an eye due to light interference according to the film thickness. The oxide film takes on a gold color when the film thickness is approximately from 10 to 20 nm, a brown color when approximately from 20 to 30 nm, a blue color when approximately from 30 to 60 nm, a yellow color when approximately from 60 to 90 nm, a purple color when approximately from 90 to 120 nm, a green color when approximately from 120 to 160 nm, and a pink color when approximately from 160 to 200 nm. Incidentally, the surface of the electrode according to the present invention comes to have a contour pattern shown in the scanning electron micrograph of FIG. 2-a.

The electrolytic electrode according to the present invention is suitably used as an anode for an electrolytic oxidation reaction to produce an active oxygen such as ozone by electrolysis in an aqueous solution, because the electrode according to the present invention has a high oxygen overvoltage and accelerates ozone production in the electrolysis of water and also the electrode has high corrosion resistance even under strong oxidation conditions resulting from ozone production.

The electrolytic electrode according to the present invention is suitably used as an anode for producing a persulfuric acid by electrolysis of a sulfate ion-containing aqueous solution, because the electrode according to the present invention has an electrolytic oxidizing ability exceeding the oxidizing ability necessary to produce oxygen by electrolysis of water and being high enough to oxidize sulfate ion to persulfate ion in a sulfate ion-containing aqueous solution and at the same time, has sufficient corrosion resistance even in an acidic solution.

The electrolytic electrode according to the present invention is suitably used as an anode for Cr(IV) plating, because the electrode according to the present invention has an electrolytic oxidizing ability high enough to oxidize Cr(III) produced by a plating reaction to Cr(VI) in a Cr(IV) plating bath.

The embodiments of the production method of the electrolytic electrode according to the present invention are described below, but the present invention is not limited to these embodiments.

In a first production method of the electrolytic electrode according to the present invention, the electrode is produced through a first step of coating a valve metal base material with a noble metal, and a second step of applying a high-temperature heat treatment at 1,000 to 1,500° C. so that the valve metal of the base material can be exposed through the noble metal coat and the exposed valve metal surface can be oxidized to form an electrode surface-near region.

In a second production method of the electrolytic electrode according to the present invention, the electrode is produced through a first step of coating a valve metal base material with a noble metal, a second step of applying a high-temperature heat treatment at 1,000 to 1,500° C. so that the valve metal of the base material can be exposed through the noble metal coat, and a third step of oxidizing the exposed valve metal surface to form a valve metal oxide film on the electrode surface.

The valve metal used in the first step is a high-melting-point metal capable of forming a passive oxide film, for example, by anodization to impart corrosion resistance, such as Ti, Zr, Nb and Ta, and Ti or Zr is preferably used. Considering the practical utility, Ti is most preferred. Also, the noble metal used in the first step may be composed of a noble metal alone or may be a noble metal alloy (including an oxide). In the case of a noble metal alone, a platinum group metal is preferably used, Pt, Ir, Ru or Pd is more preferred, and Pt is most preferred. In the case of using a noble metal alloy, an ally of a noble metal and a non-noble metal may be used, but an alloy of a noble metal and a noble metal is preferred. Above all, a combination of Pt and a platinum group metal (Pt—Ir alloy, Pt—Rh alloy, Pt—Ru alloy, Pt—Pd alloy) is more preferred. As the noble metal oxide, platinum oxide, iridium oxide, palladium oxide or ruthenium oxide is preferably used.

Examples of the method for coating a noble metal in the first step include, in addition to plating, a method of forming a noble metal film by vacuum deposition sputtering, a method of forming a noble metal film by flame spray coating or cladding, a method of forming a noble metal film by coating or vapor-depositing (CVD) a noble metal compound solution on a base material and thermally decomposing the compound, and a method of forming a noble metal film by coating a noble metal paste on a base material. From the standpoint of simply and easily performing uniform coating, plating or magnetron sputtering is preferably used. In view of profitability/productivity, a platinum group metal is coated by electroplating. In the case of performing electroplating, the valve metal surface is preferably subjected to a chemical pretreatment with a chemical such as hydrofluoric acid or a pretreatment by sand blasting. By such a treatment, the valve metal surface can be activated and a noble metal intermediate layer with good adherence can be formed, so that when exposing the valve metal by a high-temperature heat treatment in the later second step, an electrode surface-near region favorable to the electrolytic electrode and a surface thereof (electrode surface) can be formed. Incidentally, the thickness of the noble metal coat is preferably from 0.01 to 10 μm, more preferably from 0.1 to 10 μm. If the thickness is less than 0.01 μm, dispersal of the noble metal used for coating is completed in a short time at the high-temperature heat treatment and not only passivation of the valve metal oxide film constituting the electrode surface-near region cannot be easily controlled but also the noble metal present in the valve metal crystal grain boundary formed by the high-temperature heat treatment is lacking, as a result, sufficient corrosion resistance may not be obtained and the electrode may be short-lived. If the thickness exceeds 10 μm, exposure of the valve metal and dispersal of the noble metal proceed insufficiently even when heat-treated and not only the noble metal is liable to remain on the electrode surface, making it difficult to produce a homogeneous valve metal oxide film, but also the noble metal is used in a large amount, which is economically not preferred. The thickness of the noble metal is most preferably from 0.3 to 3 μm.

By the high-temperature heat treatment in the second step, the valve metal disperses through the noble metal film coat due to thermal vibration and is exposed, whereby an electrode surface-near region suitable for electrolytic reaction and a surface thereof (electrode surface) are formed. In the case where oxygen is present during the high-temperature heat treatment, the exposed valve metal surface is readily oxidized to form an oxide film. The oxide film may be also formed by oxygen present during cooling after the heat treatment or during storage after the cooling. Oxidation during cooling or during storage is performed, for example, by natural oxidation, natural oxidation in the atmosphere (at room temperature), or electrolytic oxidation at the electrolytic reaction.

The noble metal coated on the valve metal substrate disperses to the inside of the electrode by the high-temperature treatment in the second step and precipitates in the grain boundary of the valve metal. In the thus-produced electrode, the valve metal crystal in the electrode surface-near region has an elongated crystal grain, and the content of the noble metal in the range of down to 10 μm in the vertical depth direction from the electrode surface is 5 at % or less, where the noble metal is dispersed to the valve metal crystal grain boundary or to the valve metal crystal lattice. The less oxidizing noble metal precipitated in the crystal grain boundary prevents oxygen from traveling through the grain boundary and intruding into the inside of the electrode even during use of the electrode, so that not only oxidation of the crystal grain can be suppressed but also high electrical conductivity can be obtained. Moreover, thanks to the noble metal contained in the crystal grain boundary, the surface properties of the crystal grain and the electrode are stably kept, so that an excellent electrolytic function can be continuously exerted. Furthermore, the noble metal in the crystal grain makes it possible to more stably keep the surface properties of the crystal grain and the electrode and exert a more excellent electrolytic function.

The electrode according to the present invention can be suitably produced when the high-temperature treatment is from 1,000° C.×(1 to 24 hours) to 1,500° C.×(0.5 to 12 hours). If the temperature is less than 1,000° C., not only the valve metal as the base material fails in sufficiently passing through the noble metal coat and being easily exposed but also dispersal of the noble metal to the inside of the electrode is disadvantageously insufficient. In the case where the dispersal is insufficient, a structure different from the valve metal structure of the present invention results and an efficient electrolytic reaction cannot be performed. If the temperature exceeds 1,500° C., the performance is not changed any more but only the cost rises and at the same time, an excess rise in the temperature causes liquefaction of the entire valve metal and makes it difficult to form the suitable electrode structure of the present invention. The heat treatment is preferably preformed in the range of 1,100° C.×(1 to 20 hours) to 1,300° C.×(1 to 15 hours). Incidentally, the surface of the electrode according to the present invention comes to have a contour pattern shown in the scanning electron micrograph of FIG. 2-a (1,200° C.×12 hours, high-temperature heat treatment), but the surface of the electrode obtained by a heat treatment of 500° C.×24 hours comes to have a fine concavo-convex pattern shown in FIG. 2-b.

In the third step, the electrode after the high-temperature heat treatment (second step) is dipped in an aqueous solution containing a conductive salt and caused to serve as the anode of electrolysis, and a current of 0.001 A/cm² (square cm) or more is passed thereto, whereby the electrode surface is oxidized and an oxide film is formed. The third step can be performed in an early stage of use for electrolysis with a predetermined purpose or may be separately performed before use. The oxide film is a film formed by oxidation of the valve metal on a part or the whole of the surface in the exposed electrode surface-near region. The third step may be performed by forming an oxide film by a small amount of oxygen simultaneously with the high-temperature heat treatment and the cooling after heat treatment of the second step. Also, the oxide film may be formed by oxygen present during storage after cooling. Oxidation during cooling and during storage is performed by natural oxidation, natural oxidation in the atmosphere (at room temperature), or the like. In the case of oxidation during the heat treatment and the cooling after heat treatment, the oxidation reaction readily proceeds due to heat and therefore, the oxidation is preferably performed under a low oxygen partial pressure not allowing for excessive formation of an oxide film. The electrode is preferably oxidized under an oxygen partial pressure of 100 Pa or less. If the oxygen partial pressure exceeds 100 Pa, the oxide film excessively grows and this disadvantageously causes reduction in the conductivity or a trouble such as separation. As long as the oxygen partial pressure is low in the range above, the total pressure may be under reduced pressure, under atmospheric pressure, or under high pressure (such as hot pressing or HIP (hot isotropic pressing)). The oxidation is more preferably performed under an oxygen partial pressure of $10^{-2}$ Pa or less and most preferably performed under reduced pressure ($10^{-2}$ to 200 Pa) and an oxygen partial pressure of $10^{-2}$ Pa or less.

The thickness of the valve metal oxide film on the surface of the electrode according to the present invention is preferably from 3 to 200 nm. If the thickness is less than 3 nm, a sufficient performance is not obtained in the electrolytic reaction and in particular, the oxygen overvoltage disadvantageously decreases in the electrolytic oxidation reaction. If the thickness exceeds 200 nm, electron transfer from the reaction interface to the inside of the electrode is inhibited, and the efficiency of electrolytic reaction is reduced. Also, the film stress is increased to readily cause separation of the oxide film, and this disadvantageously causes reduction in the corrosion resistance or durability. The thickness is more preferably from 3 to 100 nm.

First Embodiment

A Ti base material (height: 70 mm, width: 20 mm, thickness: 1 mm) was Pt-plated and then heat-treated. In the Pt plating, the Ti base material was degreased by dipping it in an alkaline degreasing solution and after removing the passive film on the Ti base material surface with a hydrofluoric acid solution, the plating was performed with stirring to various thicknesses by using a plating bath containing a plating solution having a Pt concentration of 20 g/L (PLATINART 100, trade name, produced by Electroplating Engineers of Japan Ltd.) under the conditions of pH of 14, a liquid temperature of 85° C. and a current density of 2.5 A/dm². The Pt plating thickness was set to 0.1 μm, 0.5 μm, 1 μm, 3 μm, 5 μm, and 10 μm. The heating treatment was performed in a reduced-pressure atmosphere (degree of pressure reduction: 100 Pa, oxygen partial pressure: $1\times10^{-4}$ Pa) under the conditions of a temperature of 1,000 to 1,300° C. and from 1 to 12 hours.

Figure 2:
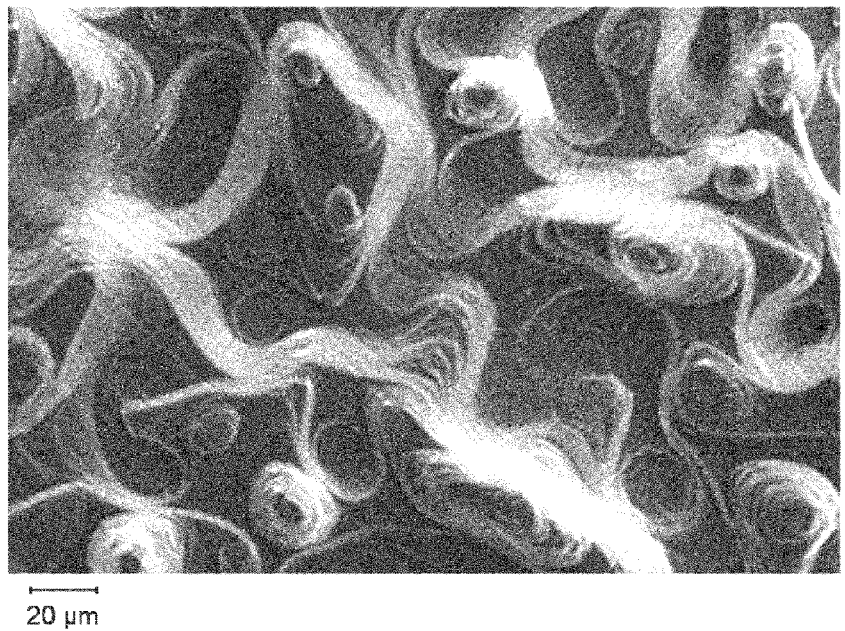
FIG. 2 shows (a) surface observation by a scanning electron microphotograph of the electrode (heat-treated at 1,200° C. for 12 hours) according to the present invention, and (b) surface observation by a scanning electron microphotograph of the electrode (heat-treated at 500° C. for 24 hours) of Comparative Example 2.
Figure 2:
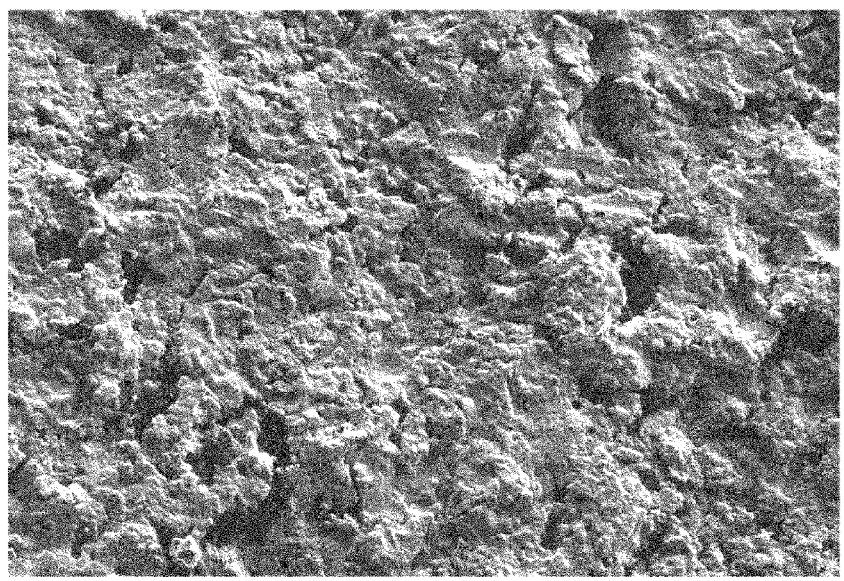

Out of electrolytic electrodes produced in the first embodiment, with respect to the electrodes obtained by setting the Pt plating thickness to 1 μm and performing a high-temperature heat treatment at 1,200° C. for 12 hours under reduced pressure, the titanium oxide film on the electrode surface was observed with an eye and found to be taking on a gold or brown gloss color. From this, it is presumed that a titanium oxide film was formed in a thickness of 10 to 30 nm. Also, the surface was observed (×500) by a scanning electron microscope (SEM), as a result, a contour pattern was observed on the electrode surface (FIG. 2-a). For comparison, an electrode was prepared by setting the Pt plating thickness to 1 μm and performing a heat treatment at 500° C. for 12 hours under reduced pressure and observed by SEM in the same manner, but the pattern on the electrode surface was apparently different from that on the surface of the electrode according to the present invention and was a fine concavo-convex pattern (FIG. 2-b). The electrode of the first embodiment after the surface observation was etched with hydrofluoric acid and then subjected to electrode cross-section observation by an optical microscope, as a result, the surface was confirmed to have an elongated crystal grain and from 10 to 20 crystal grain boundaries were observed at a vertical depth of 30 μm from the electrode surface (FIG. 1-a). Also, the platinum mapping analysis of the electrode cross-section by an electron probe microanalyzer shows most of the platinum used being precipitated in the crystal grin boundary and uniformly dispersed (FIG. 1-b). Furthermore, the presence of platinum, although a small amount, was confirmed also in a valve metal crystal lattice. By this metal mapping analysis, the content of Pt in the range of down to 10 µm in the vertical depth direction from the electrode surface was 1 at %. Electrodes prepared by employing other Pt plating thicknesses were measured for the Pt content in the range of down to 10 µm in the vertical depth direction from the electrode surface by the metal mapping analysis in the same manner and found to be 0.3 at % when the plating thickness was 0.1 µm, 2 at % when 3 µm, and 3 at % when 5 µm.

Figure 3:
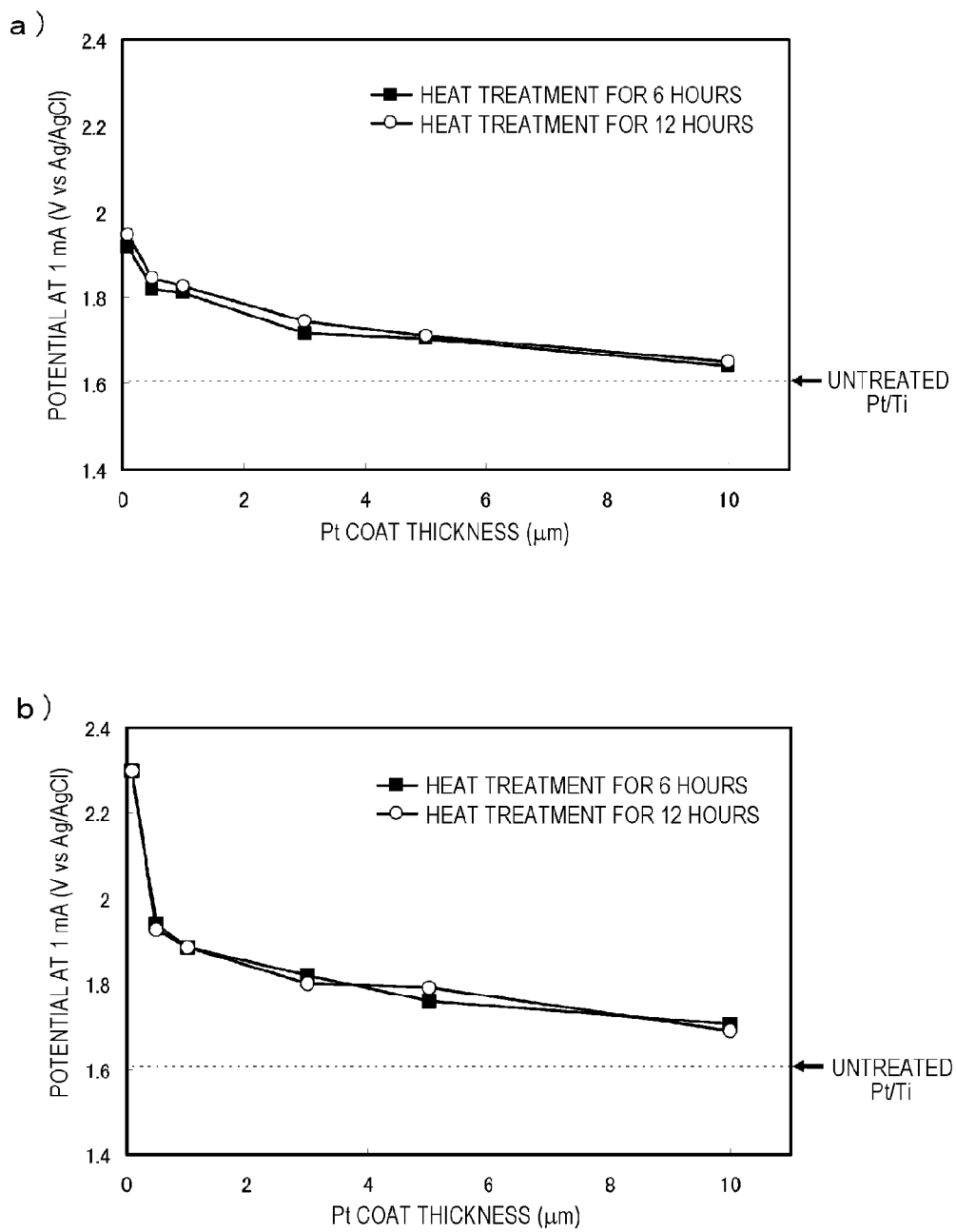
FIG. 3 is graphs showing electrode potential of the electrode according to the present invention produced by a high-temperature heat treatment at (a) 1,000° C. or (b) 1,100° C., under reduced pressure.
Figure 4:
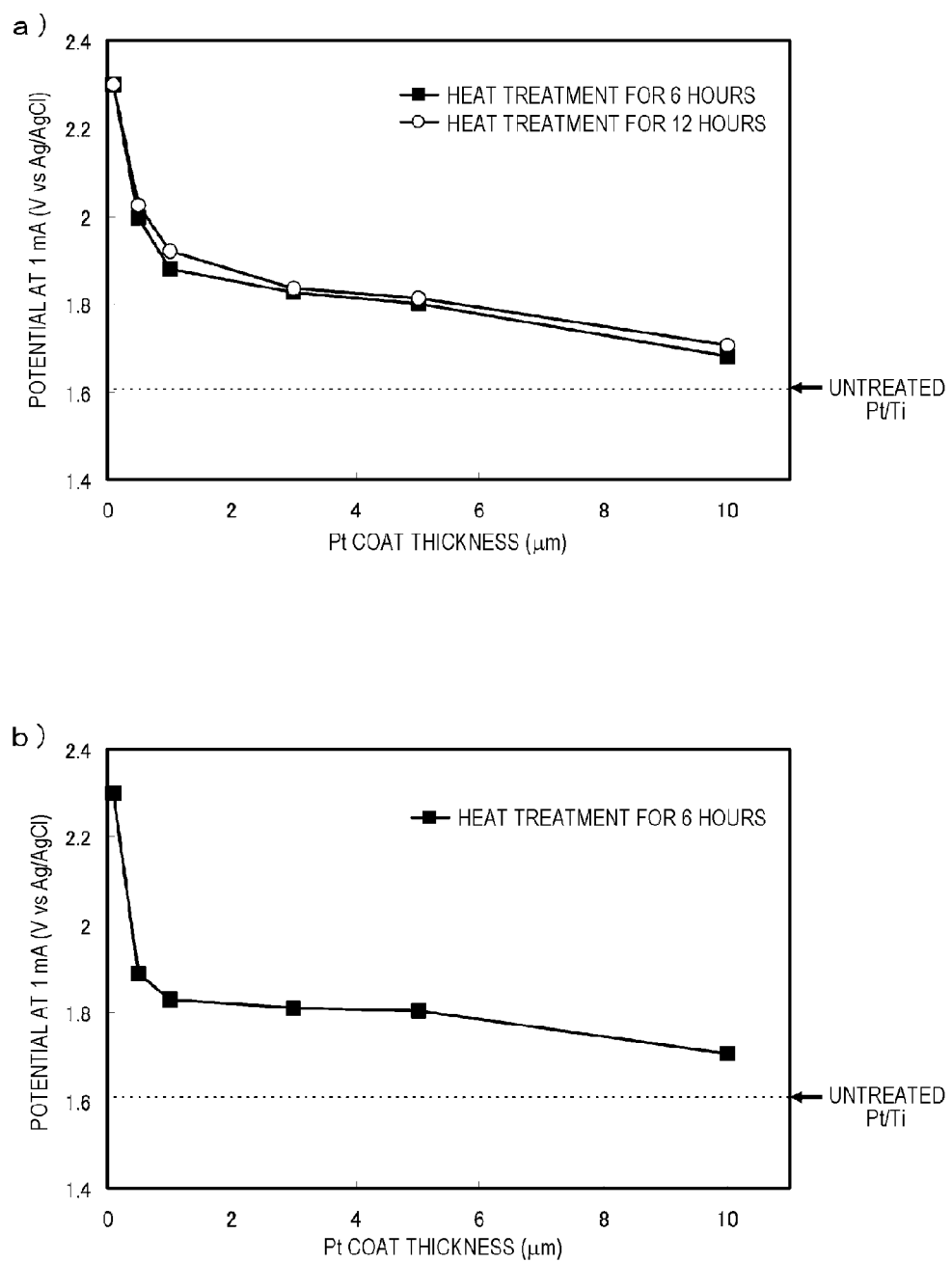
FIG. 4 is graphs showing electrode potential of the electrode according to the present invention produced by a high-temperature heat treatment at (a) 1,200° C. or (b) 1,300° C., under reduced pressure.

Using the electrodes produced in the first embodiment, the electrode potential was measured. In the measurement, a potentiometry measurement was performed by using the electrolytic electrode of this embodiment for the working electrode (anode), a Pt/Ti electrode (an electrode obtained by plating a Ti base material with Pt to a film thickness of 1 µm) for the counter electrode (cathode), and an Ag/AgCl electrode for the reference electrode. At this time, the solution was 1 M sulfuric acid (acidic solution), the current was 1 mA, and as for the measuring apparatus, an electrochemical measurement system (HZ-5000 Series, trade name, manufactured by HOKUTO DENKO) was used. FIGS. 3 and 4 show the results. In the case where an electrode (untreated) obtained by merely applying only Pt plating but not performing a high-temperature heat treatment was used under these conditions, the potential was 1.61 V (the potential denoted with the dotted line in FIGS. 3 and 4) irrespective of the Pt coat thickness. As seen from the results of FIGS. 3 and 4, in all electrodes of the first embodiment, the potential was increased as compared with the electrode obtained by merely applying only Pt plating but not performing a high-temperature treatment, and this reveals that an electrode having a high oxygen overvoltage was formed. As for the oxygen overvoltage of the electrode of the first embodiment, the same result is obtained even when a 0.1 M sodium sulfate solution that is a neutral solution, or a 0.1 M sodium hydroxide solution that is an alkaline solution, is used.

Subsequently, evaluation of the ozone formation potential of the electrolytic electrode produced in the first embodiment (FIG. 5), measurement of the potential change during ozone production using, out of electrolytic electrodes produced in the first embodiment, the electrolytic electrode produced by setting the Pt plating thickness to 1 µm and performing a high-temperature heat treatment (1,200° C., 12 hours) under reduced pressure (FIG. 6), and constant current treatments of malonic acid and geosmin using, out of electrolytic electrodes produced in the first embodiment, the electrolytic electrode produced by setting the Pt plating thickness to 1 µm and performing a high-temperature heat treatment at 1,300° C. for 1 hour under reduced pressure (FIGS. 7 and 8), were performed.

Figure 5:
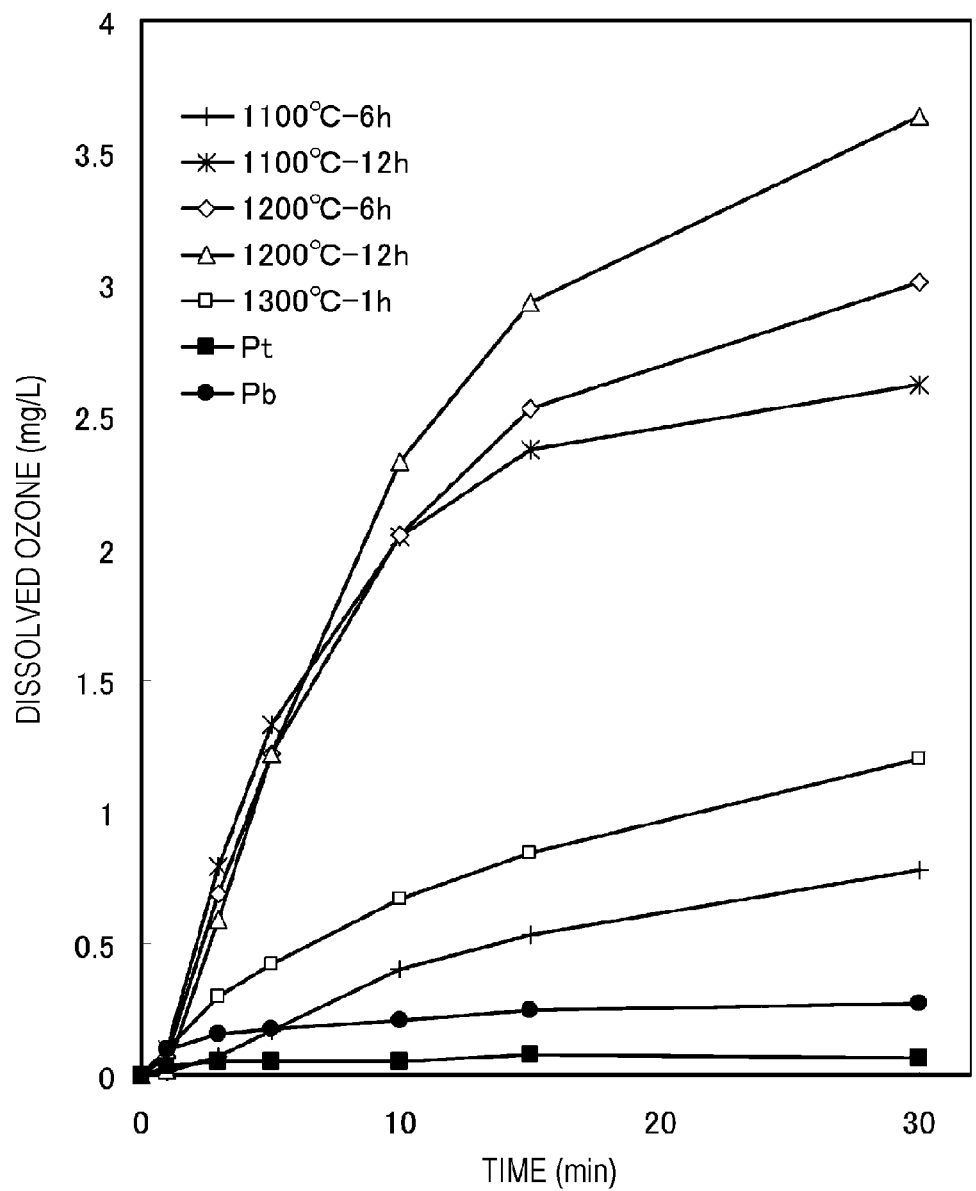
FIG. 5 is a graph showing the measurement results of ozone formation potential.

The ozone formation potential was evaluated by measuring the dissolved ozone with aging. As the electrolytic electrode, electrodes obtained by performing the high-temperature treatment of the first embodiment at 1,100° C. (for 6 hours and 12 hours), at 1,200° C. (for 6 hours and 12 hours) and at 1,300° C. (for 1 hour) were used. The dissolved ozone was measured using a dissolved ozone meter (System-In Ozone Monitor EL-550, trade name, manufactured by Ebara Jitsugyo Co., Ltd.) by performing a constant current treatment with stirring under the conditions of electrolyte: 0.1 M sulfuric acid, anode: electrolytic electrode (area: 10 cm$^2$) of this embodiment, and current density: 10 A/dm$^2$. FIG. 5 shows the results. For performance comparison, the results of a Pb electrode used for conventional ozone production and an electrode produced by only plating/coating Pt to 1 µm on a Ti base material are shown together. According to these results, when the electrode of the first embodiment was used, the ozone formation potential was remarkably enhanced.

Figure 6:
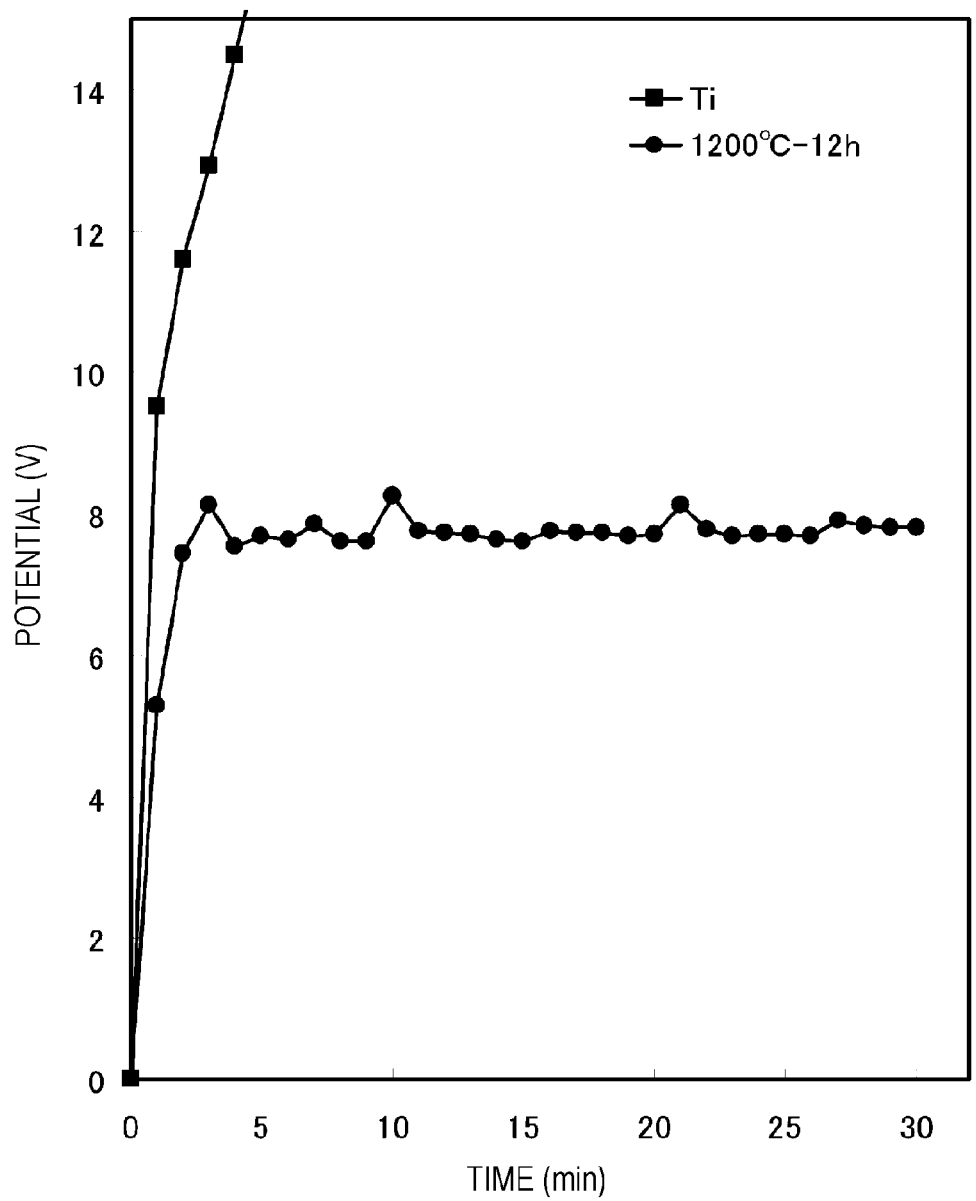
FIG. 6 is a graph showing the time-dependent change of the electrode potential under the measurement conditions of ozone formation potential.

The potential change during ozone production was measured by performing a constant current treatment with stirring under the conditions of electrolyte: 0.1 M sulfuric acid, anode: electrolytic electrode (electrode for analysis produced by setting the Pt plating thickness to 1 µm and performing a high-temperature heat treatment at 1,200° C. for 12 hours under reduced pressure; area: 10 cm$^2$) of this embodiment, and current density: 10 A/dm$^2$. FIG. 6 shows the results. It was confirmed that the potential is stabilized near 7.5 V after 3 minutes of energization and a constant potential is kept. Also, even when the measurement time was extended to 250 hours, reduction of potential was not observed. This result indicates that the electrode according to the present invention can perform stable electrolysis for a long period of time while keeping a high oxygen overvoltage.

The malonic acid treatment was performed with stirring under the conditions of treatment sample: 3 mM malonic acid, electrolyte: 0.1 M sodium sulfate, cathode: Pt/Ti electrode, current density: 5 A/dm$^2$, and temperature: 25° C. The geosmin treatment was performed with stirring under the conditions of treatment sample: 500 ng/L geosmin, electrolyte: 0.1 M sodium sulfate: cathode: stainless steel electrode, current density: 5 A/dm$^2$, and the temperature: 25° C.

Figure 7:
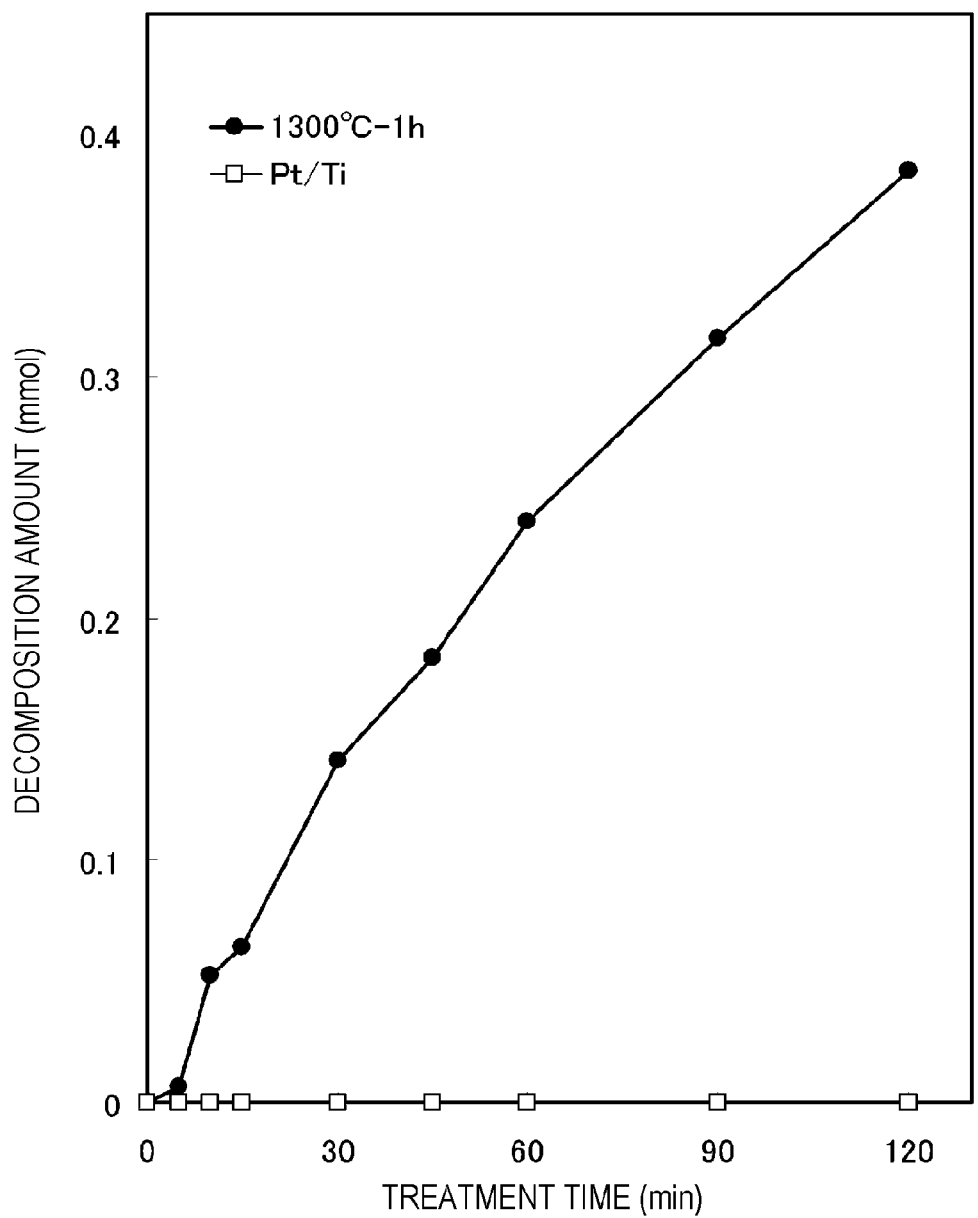
FIG. 7 is a graph showing the amount of malonic acid decomposed by a constant current treatment of malonic acid.

FIG. 7 shows a comparison between the results when a constant current treatment of malonic acid was performed using the electrode for analysis of this embodiment (electrolytic electrode produced by setting the Pt plating thickness to 1 µm and performing a high-temperature heat treatment at 1,300° C. for 1 hour under reduced pressure; area: 12 cm$^2$), and the results when using an electrode (Pt/Ti) produced by only plating Pt to 1 µm on a Ti base material. As seen from these results, the amount of malonic acid decomposed is increased in proportion to the treatment time by using the electrode according to the present invention, and this reveals that the ability for decomposing malonic acid was enhanced.

Figure 8:
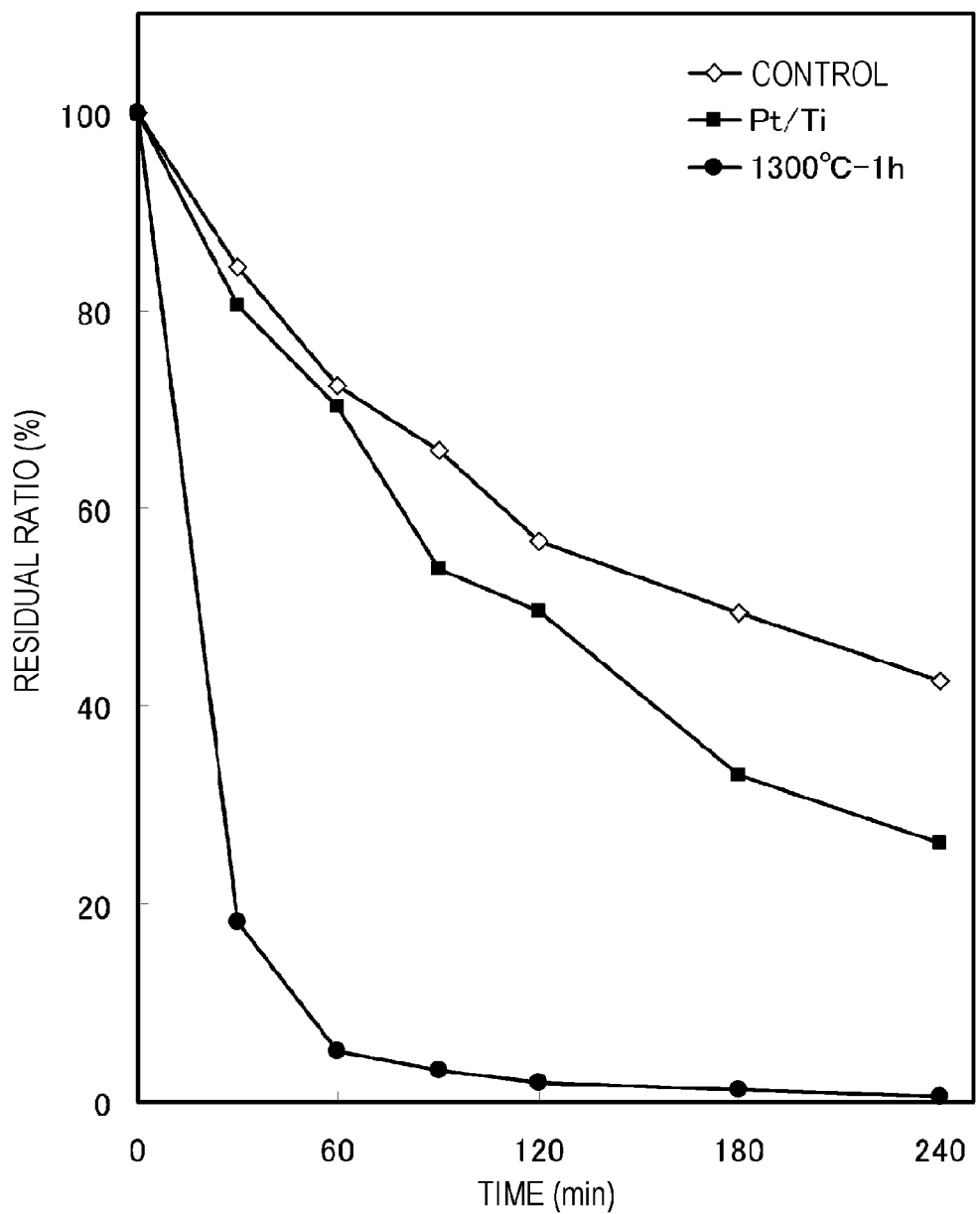
FIG. 8 is a graph showing the residual ratio of geosmin after a constant current treatment of geosmin.

Also, FIG. 8 shows a comparison between the results when a constant current treatment of geosmin was performed using the electrode for analysis of this embodiment (electrolytic electrode produced by setting the Pt plating thickness to 1 µm and performing a high-temperature heat treatment at 1,300° C. for 1 hour under reduced pressure; area: 12 cm$^2$), and the results when using an electrode (Pt/Ti) produced by only plating Pt to 1 µm on a Ti base material. Here, geosmin is a volatile substance and therefore, its concentration decreases even when an electrolytic treatment is not performed. Therefore, in order to clearly grasp the decomposition effect of electrolysis, the results when only stirring of the geosmin treatment sample was merely performed in the apparatus, are shown as control. As seen from these results, the residual ratio of geosmin is decreased in proportion to the treatment time by using the electrode according to the present invention, and this reveals that the ability for decomposing geosmin was enhanced.

Comparative Example 1

An electrolytic electrode produced by using Ti for the base material, electroplating Pt to a thickness of 0.1 µm, then forming a Ti thin film of about 0.1 µm from a tetraethoxytitanium solution by a spin coating method, and oxidizing Ti on the electrode surface by firing at 600° C. in an air atmosphere was measured for the electrode potential in the same manner as in the first embodiment, but the Ti oxide film on the surface was separated during measurement.

Comparative Example 2

The same measurement of electrode potential as in the first embodiment was performed using a pure Ti material as the electrode, as a result, the potential kept rising with the passage of energization time, and the battery went dead after 4 minutes and lost the function as an electrolytic electrode (FIG. 6). This is considered to result because an insulator film was formed on the Ti surface by electrolysis for a short time.

Second Embodiment

In a second embodiment, an electrolytic electrode was produced in the same manner as in the first embodiment except for performing a high-temperature heat treatment under high pressure (HIP treatment) instead of a high-temperature heat treatment under reduced pressure and measured for the electrode potential.

A Ti base material (height: 70 mm, width: 20 mm, thickness: 1 mm) was Pt-plated and then HIP-treated. In the Pt plating, the Ti base material was degreased by clipping it in an alkaline degreasing solution and after removing the passive film on the Ti base material surface with a hydrofluoric acid solution, the plating was performed with stirring to various thicknesses by using a plating bath containing a plating solution having a Pt concentration of 20 g/L (PLATINART 100, trade name, produced by Electroplating Engineers of Japan Ltd.) under the conditions of pH of 14, a liquid temperature of 85° C. and a current density of 2.5 A/dm$^2$. The Pt plating thickness was set to 0.01 μm, 0.1 μm, 1 μm, and 10 μm. The heating treatment was performed by an HIP treatment for 1 hour in an Ar atmosphere under the conditions of a temperature of 1,350° C. and a pressure of $1\times10^8$ Pa. At this time, the oxygen partial pressure was 100 Pa. In the measurement of electrode potential, 1 M sulfuric acid or 0.1 M sodium sulfate was used as the solution, and the measurement was performed under the same conditions as in the first embodiment.

Figure 9:
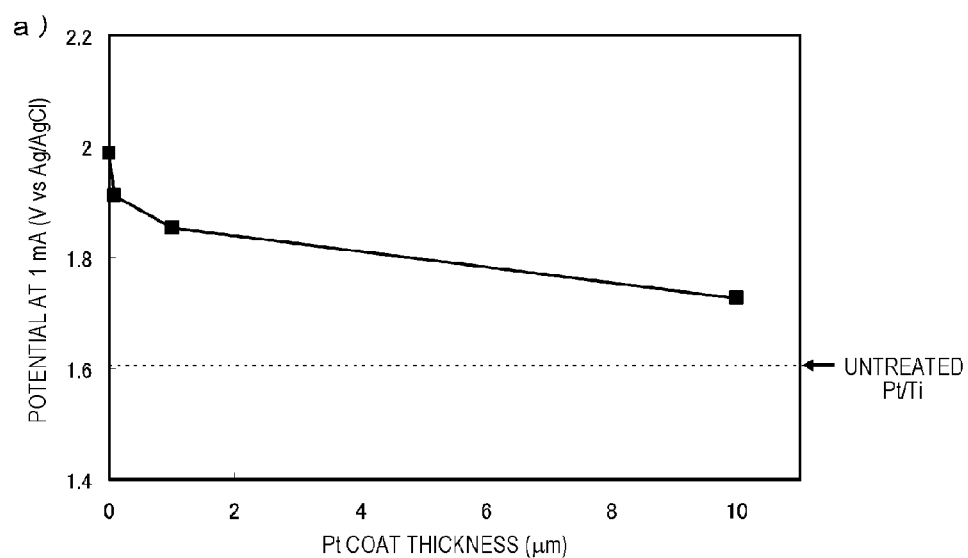
FIG. 9 is graphs showing the electrode potential of an HIP-treated electrode.
Figure 9:
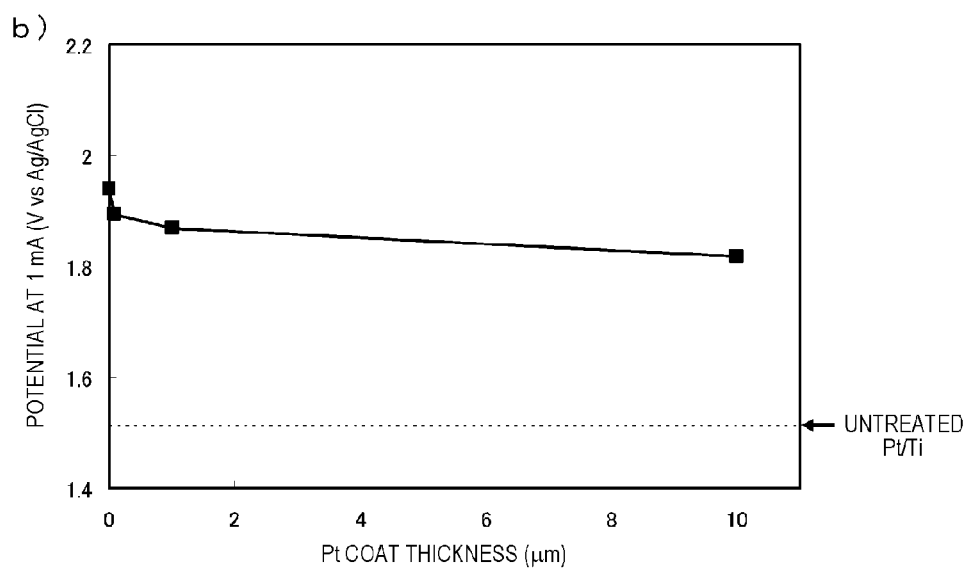

FIG. 9(*a*) is a graph showing the results when how much the electrode potential differs was measured by using the electrolytic electrode of the second embodiment and using 1 M sulfuric acid similarly to Embodiment 1. As seen from the results, in all electrodes of the second embodiment, the potential was increased as compared with the electrode obtained by merely applying only Pt plating but not performing a high-temperature treatment, and this reveals that an electrode having a high oxygen overvoltage was formed (this tendency was observed not only when the solution is a 1 M sulfuric acid solution but also when the solution is a 0.1 M sodium sulfate solution that is neutral solution (see, FIG. 9(*b*)).

Third Embodiment

In a third embodiment, an electrolytic electrode was produced in the same manner as in the first embodiment except for using a base material of Zr metal instead of a base material of Ti metal was produced and measured for the electrode potential.

A base material composed of Zr metal (height: 70 mm, width: 20 mm, thickness: 1 mm) was subjected to removal of the passive film with a hydrofluoric acid solution and then Pt-plated to 1 μm. The heating treatment was performed for 1 hour in a reduced-pressure atmosphere (degree of pressure reduction: 100 Pa, oxygen partial pressure: $1\times10^4$ Pa) under the condition of a temperature of 1,300° C. The electrode potential of the produced electrode was measured using 1 M sulfuric acid as the solution by the same method as in the first embodiment.

Electrolysis was performed at a current of 1 mA in a 1 M sulfuric acid solution in the same manner as the first embodiment, and the electrode potential of the electrode of the third embodiment was measured and found to be 2.81 V. This result indicates that the potential was increased as compared with the electrode potential 1.61 V of the electrode produced by merely applying only Pt to 1 μm on a Ti base material, and the electrode of the third embodiment also resulted in having a high oxygen overvoltage.

Fourth Embodiment

In a fourth embodiment, an electrolytic electrode was produced in the same manner as in the first embodiment except for coating any one of various platinum group metals (Ir, Ru or Pd) instead of coating by Pt plating and measured for the electrode potential.

A Ti metal was used as the base material (height: 70 mm, width: 20 mm, thickness: 1 mm) and plated with any one noble metal out of Ir, Ru and Pd to a thickness of 1 μm. In the Ir plating, the Ti base material was degreased by dipping it in an alkaline degreasing solution and after removing the passive film on the Ti base material surface with a hydrofluoric acid solution, the plating was performed with stirring by using a plating bath containing a plating solution (IRIDEX 200, trade name, produced by Electroplating Engineers of Japan Ltd.) under the conditions of a liquid temperature of 85° C. and a current density of 0.15 A/dm$^2$. In the Ru plating, the Ti base material was degreased by dipping it in an alkaline degreasing solution and after removing the passive film on the Ti base material surface with a hydrofluoric acid solution, the plating was performed with stirring by using a plating bath containing a plating solution (Ruthenex, trade name, produced by Electroplating Engineers of Japan Ltd.) under the conditions of a liquid temperature of 60° C. and a current density of 1 A/dm$^2$. In the Pd plating, the Ti base material was degreased by dipping it in an alkaline degreasing solution and after removing the passive film on the Ti base material surface with a hydrofluoric acid solution, the plating was performed with stirring by using a plating bath containing a plating solution (Palladex LF-2, trade name, produced by Electroplating Engineers of Japan Ltd.) under the conditions of a liquid temperature of 60° C. and a current density of 2 A/dm$^2$. The heating treatment was performed in a reduced-pressure atmosphere (degree of pressure reduction: 100 Pa, oxygen partial pressure: $1\times10^{-4}$ Pa) under the conditions of a temperature of 1,000° C. and 7 hours. The electrode potential of each of the produced electrodes was measured using 1 M sulfuric acid as the solution by the same method as in the first embodiment.

Figure 10:
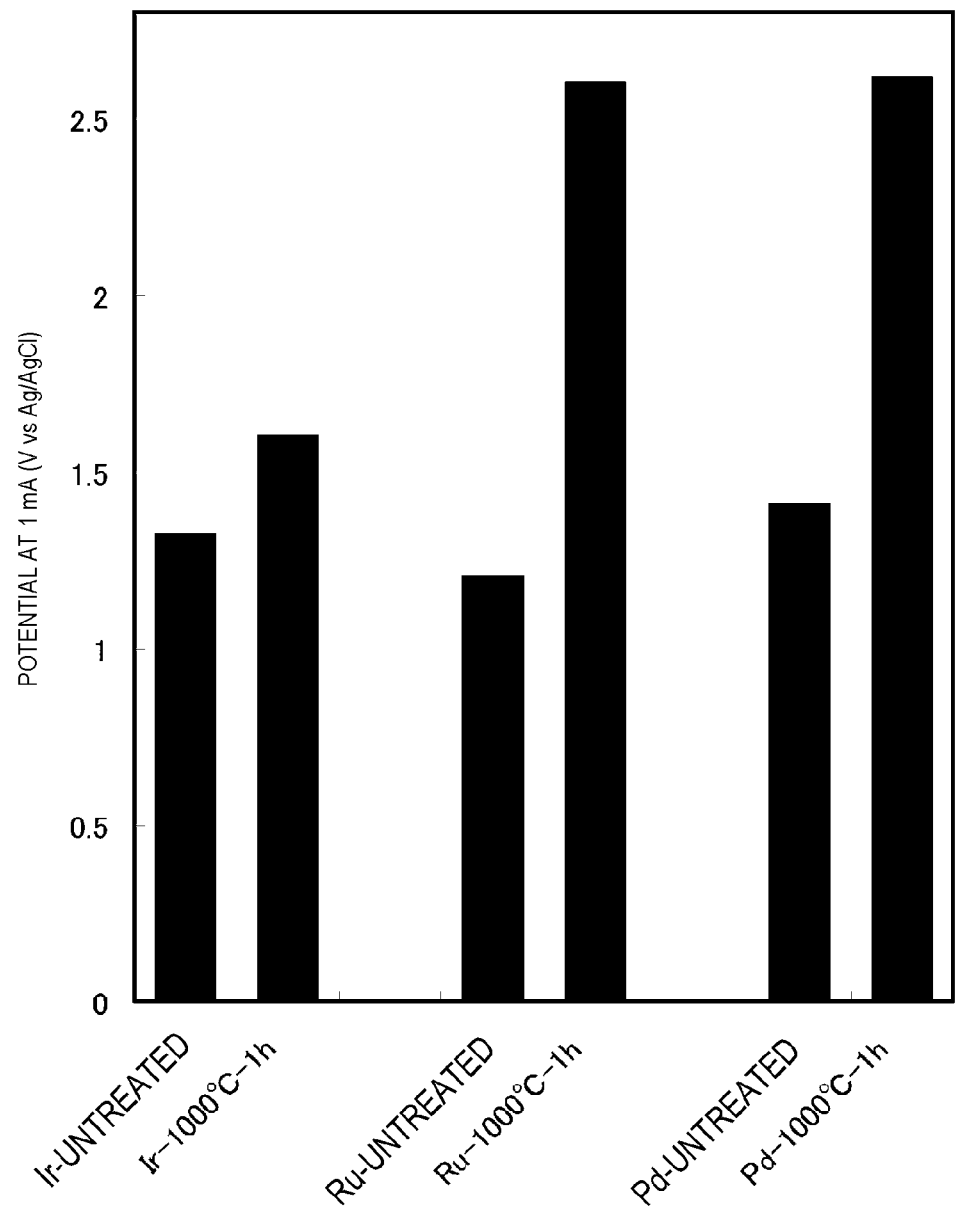
FIG. 10 is a graph showing electrode potentials of electrodes using various noble metals (Ir, Ru and Pd).

Electrolysis was performed at a current of 1 mA in a 1 M sulfuric acid solution in the same manner as the first embodiment. FIG. 10 shows the results when the electrode potential of the electrolytic electrode of the fourth embodiment produced by plating with various platinum group metals (Ir, Ru, Pd). These results indicate that the potential was increased as compared with the electrode potential of the electrode produced by merely applying only Ir, Ru or Pd to 1 μm on a Ti base material, and the electrode of the fourth embodiment also resulted in having a high oxygen overvoltage. Incidentally, the same results are obtained also in the case of an electrode produced by Rh plating.

INDUSTRIAL APPLICABILITY

The present invention relates to an electrolytic electrode having a long life and an excellent ozone formation potential.

The electrode exhibits its electrode characteristics for liquid having various liquid properties and can be stably used for a long time as an electrolytic electrode having a high electrolytic oxidizing ability. According to this electrode, ozonated water used for cleaning/sterilization treatment and the like can be produced at a low cost. Use of the electrode according to the present invention enables even a decomposition treatment of a hardly decomposable organic material such as malonic acid and geosmin. Furthermore, electrolytic production of persulfuric acid such as ammonium persulfate used for cleaning or the like of a semiconductor can be also efficiently performed. In addition, control of a bath by an oxidation reaction from Cr(III) to Cr(VI) in a plating bath during Cr(VI) plating can be facilitated.

The invention claimed is:

1. An electrolytic electrode, comprising:
   an electrode surface layer formed by a high-temperature heat treatment under a low oxygen partial pressure of 100 Pa or less, wherein the electrode surface layer includes a valve metal oxide film,
   an electrode sub-surface layer, positioned beneath the electrode surface layer, which includes a valve metal and a noble metal excluding silver (Ag), wherein the noble metal is precipitated and dispersed in a crystal grain boundary of the valve metal, wherein
   a region of down to 30 μm in a vertical depth direction from the electrode surface comprises crystal grains arranged in an elongated orientation in a vertical cross-section from the electrode surface, and
   a region of down to 10 μm in the vertical depth direction from the electrode surface contains 5 at % or less of the noble metal dispersed in the crystal grain boundary of the valve metal.

2. The electrolytic electrode according to claim 1, wherein the noble metal is a platinum group metal.

3. The electrolytic electrode according to claim 1, wherein the noble metal is platinum (Pt), iridium (Ir), ruthenium (Ru) or palladium (Pd).

4. The electrolytic electrode according to claim 1, wherein the region of down to 10 μm in the vertical depth direction from the electrode surface contains from 0.01 to 5 at % of the noble metal.

5. The electrolytic electrode according to claim 1, wherein the valve metal is titanium (Ti) or zirconium (Zr).

6. The electrolytic electrode according to claim 1, wherein the thickness of the valve metal oxide film is from 3 to 200 nm.

7. The electrolytic electrode according to claim 1, which is used as an anode for producing ozone by electrolysis of an aqueous solution.

8. The electrolytic electrode according to claim 1, which is used as an anode for producing a persulfuric acid by electrolysis of a sulfate ion-containing aqueous solution.

9. The electrolytic electrode according to claim 1, which is used as an anode for oxidizing trivalent chromium (Cr(III)) to hexavalent chromium (Cr(VI)) in a chromium (Cr) plating bath.

* * * * *